M. BUGHER.
Grain Winnower.
No. 30,047.  Patented Sept. 18, 1860.
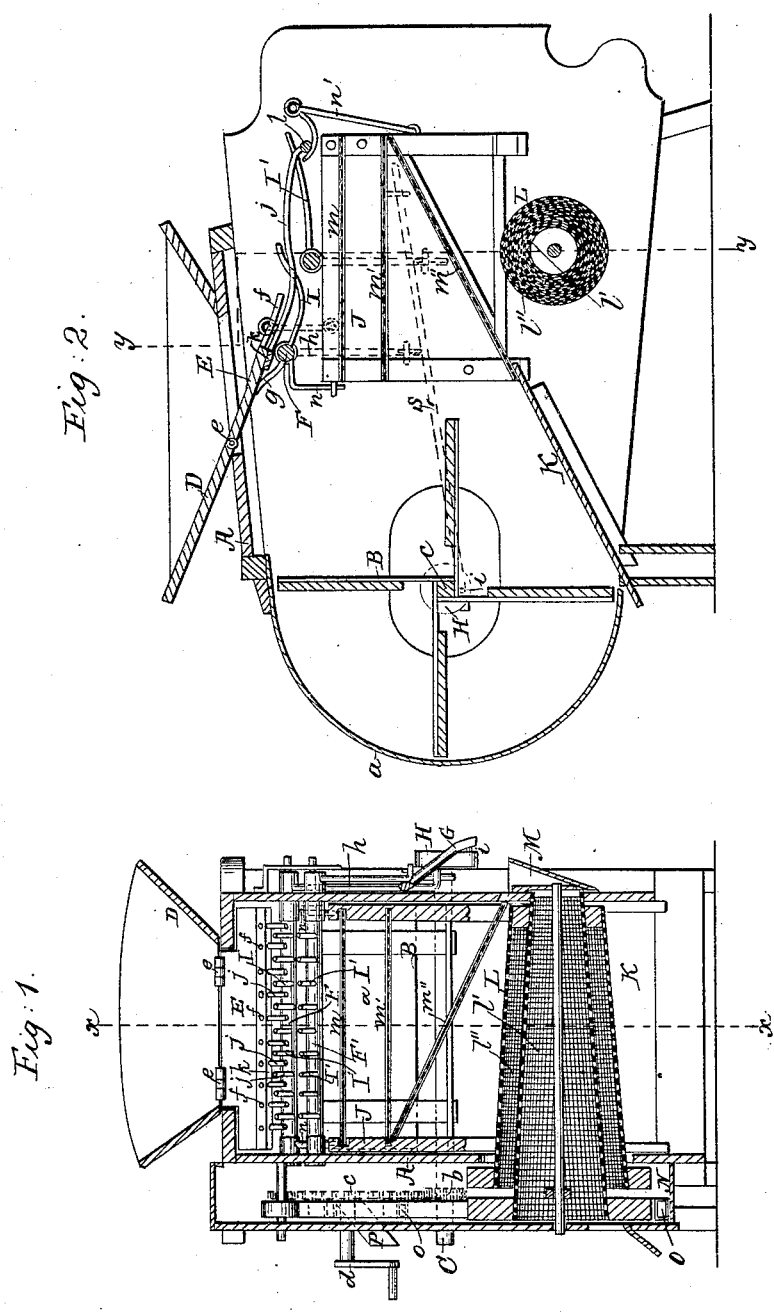

UNITED STATES PATENT OFFICE.

MOSES BUGHER, OF NEW PHILADELPHIA, OHIO.

GRAIN-SEPARATOR.

Specification of Letters Patent No. 30,047, dated September 18, 1860.

*To all whom it may concern:*

Be it known that I, MOSES BUGHER, of New Philadelphia, in the county of Tuscarawas and State of Ohio, have invented a new and Improved Grain-Separator; and I do hereby declare that the following is a full, clear, and exact description of the same, reference being had to the accompanying drawing, forming a part of this specification, in which—

Figure 1 represents a transverse vertical section of this invention, the line $y, y$, Fig. 2, indicating the plane of section, Fig. 2 is a longitudinal vertical section taken in the plane indicated by the line $x, x$, Fig. 1.

Similar letters of reference in both views indicate corresponding parts.

This invention consists, 1st, in the arrangement of a double series of tossing rakes in combination with the hinged bottom of the hopper and with a series of curved wires extending from said hinged bottom or delivering board, and with the shoe, so that the grain as it drops down from the hopper, is cleared from the largest portion of its impurities as it passes over the several rakes and screens; 2nd, in the arrangement of teeth and rods extending from one of the rake shafts for the purpose of imparting motion to the delivering board and to the shoe; 3rd, in the combination with the tossing rakes, and shoe of a double conical, revolving riddle, and elevator, for the purpose of thoroughly separating the grain from all impurities and to discharge the good grain into sacks or other receptacles from the top while the impurities which have been carried down with the grain into the conical riddles are discharged from the bottom.

To enable those skilled in the art to make and use my invention, I will proceed to describe its construction and operation with reference to the drawing.

The frame A, which incloses the working parts of my separator, is similar in its form and construction to the frames of ordinary separators. On one end of this frame and inclosed by a scroll $a$, is the fan-blower B, arranged on a rotary shaft C, to which motion is imparted by a pinion $b$, which gears into a large cogwheel $c$, on a crank-shaft $d$, which is rotated either by hand or by any other power.

The grain is introduced into the separator through a hopper D, and it passes down over the inclined bottom or delivering board E, which is attached to one side of the hopper by means of hinges $e$, and which is provided with teeth $f$, projecting from its front edge. An oscillating motion is imparted to the delivering board by teeth $g$ which project from one side of a shaft F, to which a rocking motion is imparted through the action of an arm $h$, which connects with a rod G, that is attached to an eccentric wrist pin $i$, projecting from the face of a disk H, on the driving shaft. A series of curved rods $j$ which are connected with one end to a cross-piece $k$, attached to the under side of the delivering board and the other ends of which are united by a cross bar $l$, partake of the motion of the delivering board E.

The tossing rakes I, I', operate between the curved rods $j$ and they are attached to the rock shafts F, F', the shaft F', being parallel to the shaft F and receiving its motion from the same rod G, which imparts motion to the rock shaft F as above described.

By the action of the tossing rakes I, I', and of the oscillating curved rods $j$ the grain as it enters from the hopper, is shaken out of the chaff and the chaff and other impurities are blown out of the machine through the action of the fan blast. From the tossing rakes the grain passes down on the upper riddle $m$ in the shoe J. The shoe is suspended from arms $n$, which are attached to the rock shaft F, and from bars $n'$, that are pivoted to the sides of the frame A, and on rotating the driving shaft a shaking motion is imparted to the shoe in a longitudinal direction by the action of the arms $n$. From the riddle $m$ the grain passes down the second riddle $m'$, and from this into the riddle $m''$, and from this riddle the grain is either brought directly to the inclined chute K, or to the double conical revolving sieve L. In the former case the grain on passing over the chute K, is exposed to a powerful blast from the fan B and all the impurities still remaining with the grain are driven out in front of the machine while the good grain discharges from the chute close under the scroll $a$. In many cases however it is desirable to pass the grain from the riddle $m''$, to the conical revolving sieve L, and in this case the position of the riddle $m''$, is changed from that shown in Fig. 2, to that shown in Fig.

1, so that the grain on passing from said riddle drops into a hopper M, on the side of the machine, which (hopper) conducts it to the interior part $l'$, of the double revolving sieve L. The meshes of the inner sieve $l'$, are larger than the meshes of the outer sieve $l''$, and as the grain passes over said sieve $l'$, the impurities larger than the grain are retained and the grain and the impurities smaller than the grain drop through the meshes of the inner sieve into the outer sieve $l''$. This sieve retains the good grain, and the impurities smaller than the grain drop through the meshes. By these means the grain is thoroughly cleaned and it is discharged, in a perfectly pure state, into the scroll N, from whence it is taken up by the elevator cups O, and discharged through the spout P, into sacks or other receptacles. The impurities are partly blown out in front of the machine through the action of the blast and partly they are discharged from the double sieve L, at the bottom of the machine.

The construction of my separator is very simple, the tossing rakes, the delivering board and the shoe being all moved through the action of one and the same rod G, and this rod is connected with the disk H, and with the rock shafts F, F', in such a manner that all dead motion is completely obviated. By the combined action of the tossing rakes and of the riddles on the shoe the grain is freed from its impurities much more perfectly than with separators of the usual construction, and by combining with the shoe and riddles and with the rotary double conical sieves, the elevator, the good grain can be separated from the impurities and put away in sacks or other receptacles without additional labor.

Having thus fully described my invention what I claim as new and desire to secure by Letters Patent, is—

1. The arrangement of the double series of tossing rakes I, I', in combination with the hinged hopper bottom or delivering board E, curved rods $j$, and shoe J, constructed and operating, substantially as and for the purpose set forth.

2. The arrangement of the rear extending teeth $g$, and arms $n$, extending from the oscillating rake head F, substantially as described for the purpose of imparting the desired motion to the delivering board and to the shoe.

3. The arrangement of the tossing rakes I, I', shoe J, double conical revolving sieve L, and an elevator O, substantially in the manner and for the purpose herein specified.

MOSES BUGHER.

Witnesses:
W. B. CROXTON,
SOLOMON HOOVER.